United States Patent
Baek et al.

(10) Patent No.: US 7,129,511 B2
(45) Date of Patent: Oct. 31, 2006

(54) INTEGRATED SCAN MODULE FOR A COMPUTER RADIOGRAPHY INPUT SCANNING SYSTEM

(75) Inventors: Seung-Ho Baek, Pittsford, NY (US); Rongguang Liang, Penfield, NY (US); Roger S. Kerr, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 281 days.

(21) Appl. No.: 10/719,630

(22) Filed: Nov. 21, 2003

(65) Prior Publication Data

US 2005/0109964 A1    May 26, 2005

(51) Int. Cl.
*G01N 23/04*    (2006.01)

(52) U.S. Cl. ...................................................... 250/586
(58) Field of Classification Search ............... 250/361, 250/336.1, 338.1, 340, 586
See application file for complete search history.

(56) References Cited

U.S. PATENT DOCUMENTS

| 4,346,295 A | | 8/1982 | Tanaka et al. |
| RE31,847 E | | 3/1985 | Luckey |
| 4,725,891 A | * | 2/1988 | Manian ...................... 358/406 |
| 4,742,225 A | | 5/1988 | Chan |
| 4,829,180 A | * | 5/1989 | Goto et al. ................. 250/586 |
| 2002/0057339 A1 | * | 5/2002 | Shoenfeld ..................... 348/86 |

* cited by examiner

*Primary Examiner*—David Porta
*Assistant Examiner*—Marcus Taningco
(74) *Attorney, Agent, or Firm*—NelsonAdrianBlish

(57) ABSTRACT

A scanning module (8) and scanning system, wherein the system includes a housing (10) having a channel (12), a cylindrical center chamber (25) in communication with the channel including a mirrored surface, a first opening (14) communicating with the cylindrical chamber and a second opening (16) communicating with the cylindrical chamber, an analog to digital converter (54) adapted to receive a signal from the light detector (58*a*), a control processing unit adapted to receive the signal from the analog to digital converter (58*b*), wherein the control processing unit stores the signal (58*c*) and an output device (56) adapted to receive the signal from the control processing unit.

14 Claims, 5 Drawing Sheets

INTEGRATED SCAN MODULE FOR A COMPUTER RADIOGRAPHY INPUT SCANNING SYSTEM

CROSS REFERENCE TO RELATED APPLICATIONS

Reference is made to commonly-assigned co-pending U.S. patent application Ser. No. 10/718,901, filed Nov. 21, 2003, entitled COMPUTER RADIOGRAPHIC SCANNER UTILIZING A SCAN BAR, by Kerr et al.; and U.S. patent application Ser. No. 10/718,903, filed Nov. 21, 2003, entitled COMPUTER RADIOGRAPHIC SCANNER HAVING A LIGHT EMITTING DIODE ARRAY AND CHARGE COUPLED DETECTOR ARRAY, by Kerr et al., the disclosures of which are incorporated herein.

FIELD OF THE INVENTION

This invention relates in general to radiography and in particular to scanning a computer radiographic phosphor plate having a latent image to generate a digital image file.

BACKGROUND OF THE INVENTION

In a photo-stimulable phosphor imaging system, as described in U.S. Pat. No. RE 31,847, a photo-stimulable phosphor sheet is exposed to an image wise pattern of short wavelength radiation, such as x-radiation, to record a latent image pattern in the photo-stimulable phosphor sheet. The latent image is read out by stimulating the phosphor with a relatively long wavelength stimulating radiation such as red or infrared light. Upon stimulation, the photo-stimulable phosphor releases emitted radiation of an intermediate wavelength such as blue or violet light in proportion to the quantity of short wavelength radiation that was received. To produce a signal useful in electronic image processing, the photo-stimulable phosphor sheet is scanned in a raster pattern by a beam of light produced for example by a laser deflected by an oscillating or rotating scanning mirror and the emitted radiation is sensed by a photo-detector such as a photomultiplier tube to produce the electronic image signal.

In one type of scanning apparatus, the photo-stimulable phosphor sheet is placed on a translation stage and is translated in a page scan direction past a laser beam that is repeatedly deflected in a line scan direction to form the scanning raster.

To optimize the signal-to-noise ratio (S/N) of the imaging system, it is desirable to collect as much of the emitted light as possible and to direct it to the photo-detector. While the apparatus employed to collect the light may take various forms, one form of light collector is proposed in U.S. Pat. No. 4,346,295. The light collector proposed by U.S. Pat. No. 4,346,295 comprises a sheet of light transmitting material that is flat on one end, and rolled into an annular shape on the opposite end. The flat end of the light collector is positioned adjacent the scan line on the photo-stimulable phosphor sheet. The light receiving face of a photomultiplier tube is placed against the annular end of the light collector. Light emitted from the phosphor sheet enters the flat end of the light collector and is light piped to the photomultiplier tube. Improved light collection efficiencies are achieved by having two such light collectors, one on each side of the scan line, or by placing a long narrow reflector opposite the flat end of the light collector to increase the collection window of the light collector. The transparent light collector has the drawback that it is inherently complicated to manufacture. Furthermore, the collection efficiency of transparent light guides is limited due to their absorption in the wavelength range of light emitted by the photo-stimulable phosphor sheet (e.g. blue-violet).

Experiments have identified another factor that limits the signal-to-noise ratio achievable with the photo-stimulable phosphor imaging apparatus. As the photo-stimulable phosphor sheet is scanned by the stimulating radiation beam, a high percentage (up to 90%) of the stimulating radiation is reflected from the photo-stimulable phosphor. If this reflected stimulating radiation is further reflected back on to the surface of the photo-stimulable phosphor (it is then called "flare") in a location away from the instantaneous scanning point, the phosphor will be stimulated to emit in these other locations. When this flare induced emission of light is collected by the light collector it is called prestimulation and results in a spurious background signal. Such reflection of the stimulating radiation onto the photo-stimulable phosphor may occur from the light collecting edge of the light guide described above. Examples of the image degradation caused by prestimulation include a reduction in the contrast of images due to flare induced emission from high exposure areas. This adds unwanted signal to low exposure areas. Shadow artifacts are produced in the image when a high exposure object on a low exposure background field is scanned. The signal-to-noise ratio in all image areas is degraded. Laser noise is enhanced since a large area of the phosphor is exposed to a low level of stimulating radiation, the light emitted from this area will follow the fluctuations in laser power, thereby amplifying the effect of the laser noise.

It is therefore the object of the present invention to provide a light collector having improved collection efficiency and one that is easy to manufacture.

SUMMARY OF THE INVENTION

An embodiment of the present invention is a scanning module for emitting light to and collecting light from a photo-stimulable radiographic sheet made of a housing with a channel, a first and second openings, and a cylindrical center chamber with a mirrored surface. The scanning module also has a laser disposed in the housing that generates a beam of stimulating electromagnetic radiation through the channel into the first opening onto a stimulated area on the photo-stimulable radiographic sheet and collects light emanating from the stimulated spot and reflected light to enter the first opening. A light detector disposed in the second opening receives light resulting from the beam stimulating the photo-stimulable radiographic sheet. A filter disposed at the second opening of the housing passes only the stimulated light from the photo-stimulable radiographic sheet to the light detector.

Another embodiment of the present invention is a system for emitting light to and collecting light from a photo-stimulable radiographic sheet. The system includes a scanning module for emitting light to and collecting light from a photo-stimulable radiographic sheet, an analog to digital converter adapted to receive a signal from the light detector disposed in the scanning module; a control processing unit adapted to receive the signal from the analog to digital converter, wherein the control processing unit stores the signal; and an output device adapted to receive the signal from the control processing unit.

The invention and its objects and advantages will become more apparent in the detailed description of the preferred embodiments presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with accompanying drawings.

DETAILED DESCRIPTION OF THE INVENTION

Figure 1:
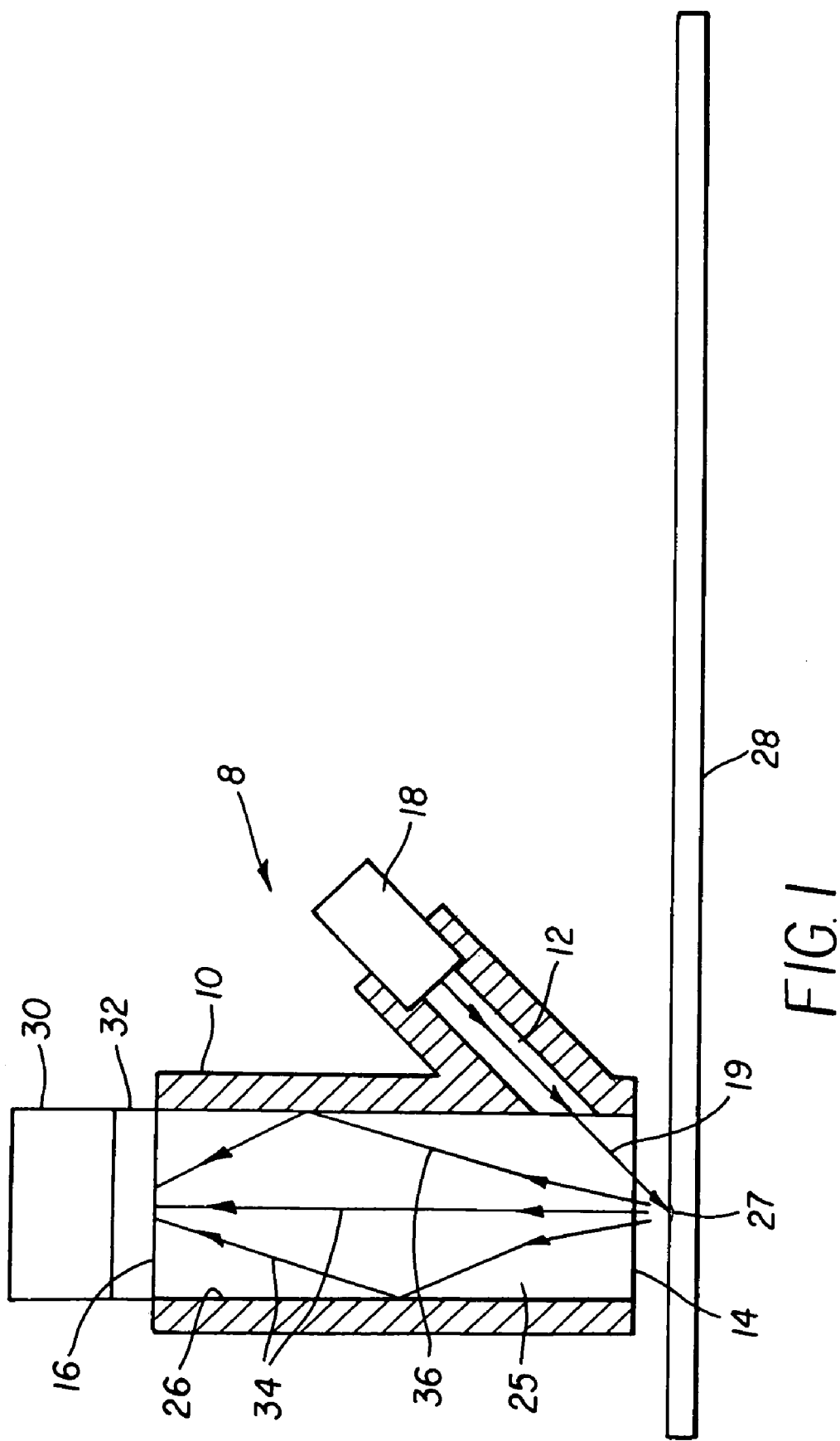
FIG. 1 depicts a side view of the scanning module.

The present invention will be directed in particular to elements forming part of, or in cooperation more directly with the apparatus in accordance with the present invention. It is to be understood that elements not specifically shown or described may take various forms well known to those skilled in the art.

The scanning module has a housing and a mirrored container in the housing that can have an elliptical design. The module contains a laser that transmits a beam of light onto a radiographic plate, such as a phosphorous plate to create an image with a high sensitivity, around 0.7 mj/cm2, an image quality as good as 300 dpi, and a rate of productivity that is preferably between 80 plates per hour and 120 plates per hour. The module can have a small compact design, such as with a diameter of 15 mm to 23 mm, preferably 20 mm, and a length that creates as an ellipsoid with a surface calculated from the following formula:

$$(x^2/9.6437^2)+(y^2/9.6437^2)+((z-11)^2/17^2)=1$$

The scanning module is adapted for emitting light to and collecting light from a photo-stimulable radiographic sheet, such a phosphorous sheet or other similar radiographic sheet, filtering that light and then converting the light into a digital signal.

The integrated scanning module can be used for line scanning or swath scanning. To operate the module, a laser disposed in a housing emits a beam of light onto the graphic sheet. In the most preferred embodiment, one laser is used per module. It is contemplated that multiple housing can be connected together, in parallel to form a swath for scanning over multiple spots.

The beam, which is preferably from a Hitachi single mode 635 nm, 35 mW laser or alternatively a multi mode 635 nm, 100 mW laser could be used. The beam is directed at discrete spots on the radiographic plate that already contains latent images.

The beam stimulates the radiographic plate to produce light that is collected by the module, in a preferably cylindrical, ellipsoid shaped mirrored container. A minor amount of reflected light may be collected as well.

A blue filter is used to selectively pass only the light from the radiographic image to a light detector that is preferably a PMT device, (at least one photo-multiplier tube) or a solid state photodiode. The filter is of the type Hoya 390 or B 410 from Tokyo, Japan or alternatively Schott BG-1 or BG 3 filter available from Schott of Mainz, Germany.

The light detector, such as a PMT made by Hamamatsu or a photomultiplier type R7400U available from Japan, receives the filtered light and generates a signal. The signal is transmitted to an analog to digital converter is usable to provide a digital signal. The digital signal is then stored as an image frame in a control processor, such as a computer like a PC or MAC.

Next, the digital image can be processed depending on the needs of the user. For example, the digital image could then be printed on black and white x-ray film.

The scanning module is contemplated for use as an input scanner.

Multiple modules can be used to scan a radiographic plate. Alternatively, only one module can be used to scan for individual spots on a plate. Both individual and multiple modules can be used to swath scan, diagonally, multiple spots on the plate.

Further, individual modules can be placed on a rotating disc over a stationary plate to achieve faster scanning of an image than with the line scanning method. The use of the modules on a rotating disc provides a more smooth, more even scanning of the image.

Alternatively, the plate can be rotated and the modules held stationary to achieve a smooth scan of the image.

FIG. 1 depicts the embodiment of a scanning module for emitting light to and collecting light from a photo-stimulable radiographic sheet. The scanning module has a housing 10 with a channel 12 and the first and second openings 14 and 16. The scanning module also has cylindrical center chamber comprising a mirrored surface.

Within the housing 10, the scanning module has a laser 18 and is oriented to generate a beam of stimulating electromagnetic radiation through the channel 12 into the first opening 14. The beam is preferably between 390 and 400 nm in size. The beam flows through the first opening 14 onto a stimulated spot 27 on a photo-stimulable radiographic sheet 28. Light 34 is emitted from the stimulated spot and reflected light 36 bounces from the radiographic sheet 28 to enter the first opening 14. The emitted light 34 is then transmitted from the center channel out of the second opening 16 to the filter 32. The filter 32 only permits the light emitted from the stimulated spot 27 to pass to the light detector 30.

In a preferred embodiment, the center chamber 25 has the following dimensions: a length between 20 mm and 30 mm, preferably about 25 mm; a height between 20 mm and 25 mm, preferably about 20 mm; and a width between 20 mm and 25 mm, preferably about 20 mm.

Figure 5:
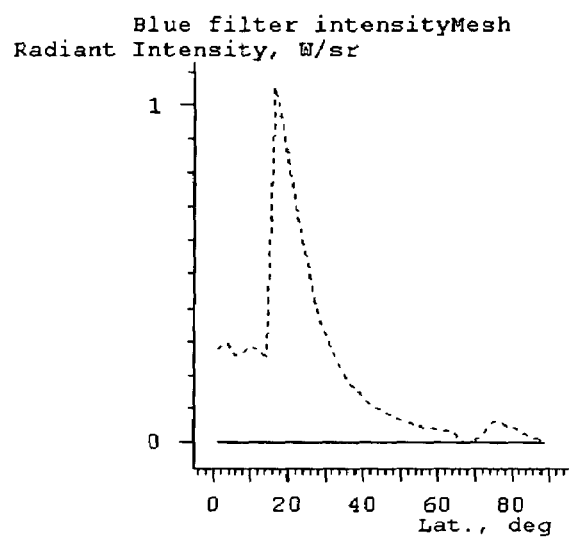
FIG. 5 is Table 1.
Figure 6:
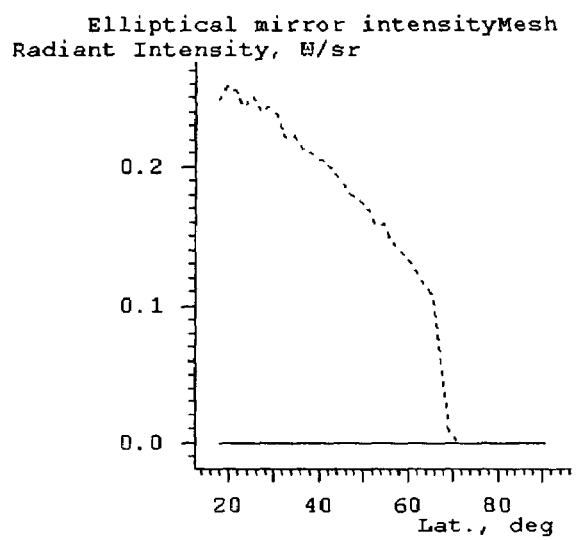
FIG. 6 is Table 2.

FIG. 5 and FIG. 6 show the optimum coating specifications for the reflective coating used in the center chamber 25 as used in the scope of the invention.

Returning to FIG. 1, the light detector 30 is disposed in the second opening for receiving light from filter 32 also disposed at the second opening of the housing.

In the most preferred embodiment, the housing 10 can be a one-piece molded structure of a strong polycarbonate, a strong plastic, or a metal. A preferred overall dimension of the housing is a height of 54 mm, a width of 35 mm, and a length of 25 mm.

Alternatively, the housing 10 can be a two-piece construction. In the two-piece construction, the two halves can be joined by conventional attaching devices, such as a latch, welds, or one or more screws.

Figure 2:
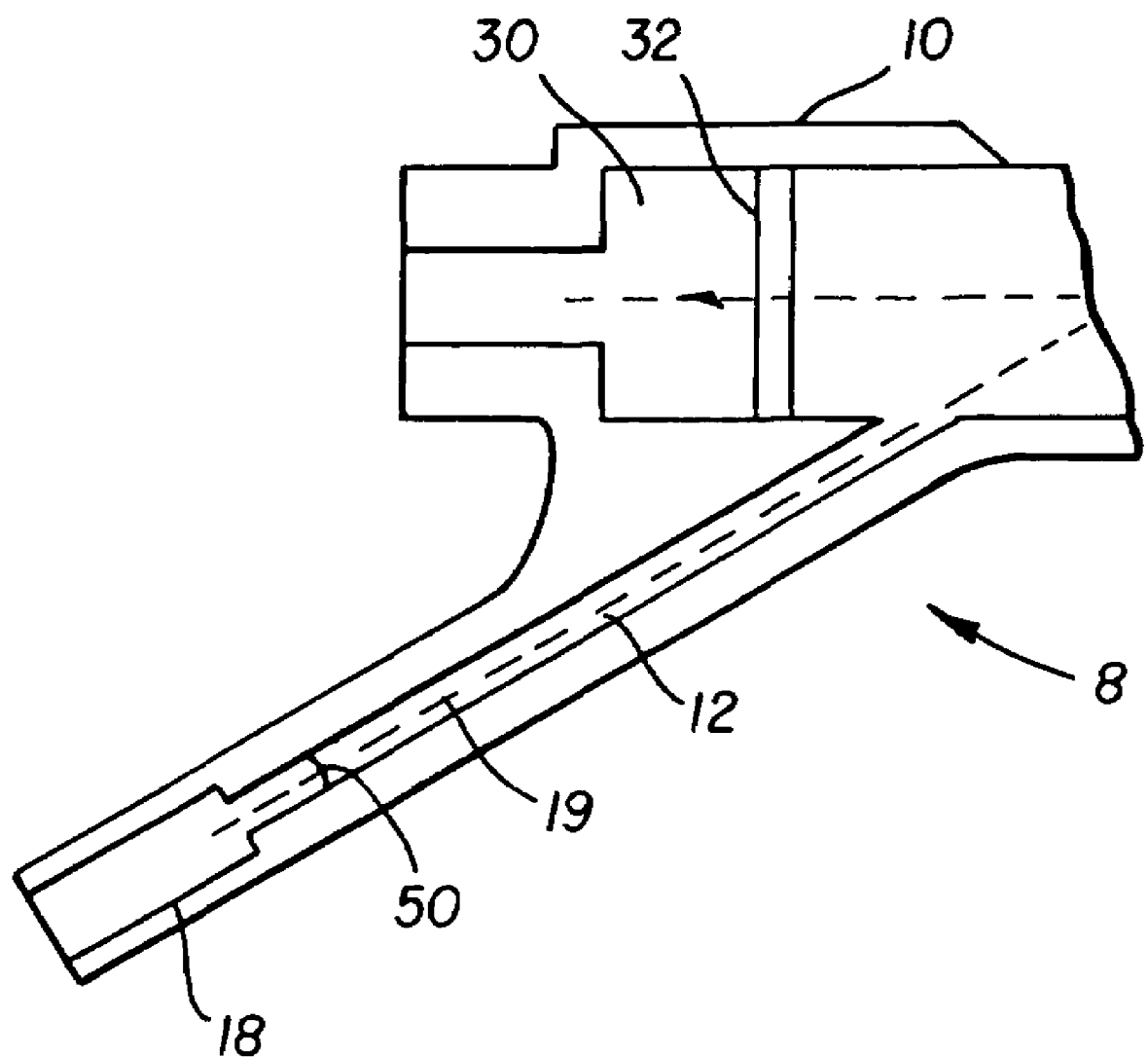
FIG. 2 depicts a side view of the scanning module with a collimator lens.

FIG. 2 depicts an embodiment of a scanning module 8 for emitting light to and collecting light from a photo-stimulable radiographic sheet. The housing 10 includes a channel 12, a first opening 14, and a second opening 16. The laser 18 is disposed in the housing and generates a beam 19 of stimulating electromagnetic radiation through the channel 12 into the first opening 14.

The beam 19 can in one embodiment pass through a collimator lens 50 prior to passing out of the channel 12.

Another embodiment is a system for emitting light to and collecting light from a photo-stimulable radiographic sheet and then storing the image. The system includes a scanning module 8 for emitting light to and collects light from a photo-stimulable radiographic sheet. The scanning module is the same as the module of FIG. 1.

In another embodiment, individual modules can be placed on a rotating disc over a stationary plate to achieve faster scanning of an image. The use of the modules on a rotating disc provides a smooth, even scanning of the image.

Figure 3:
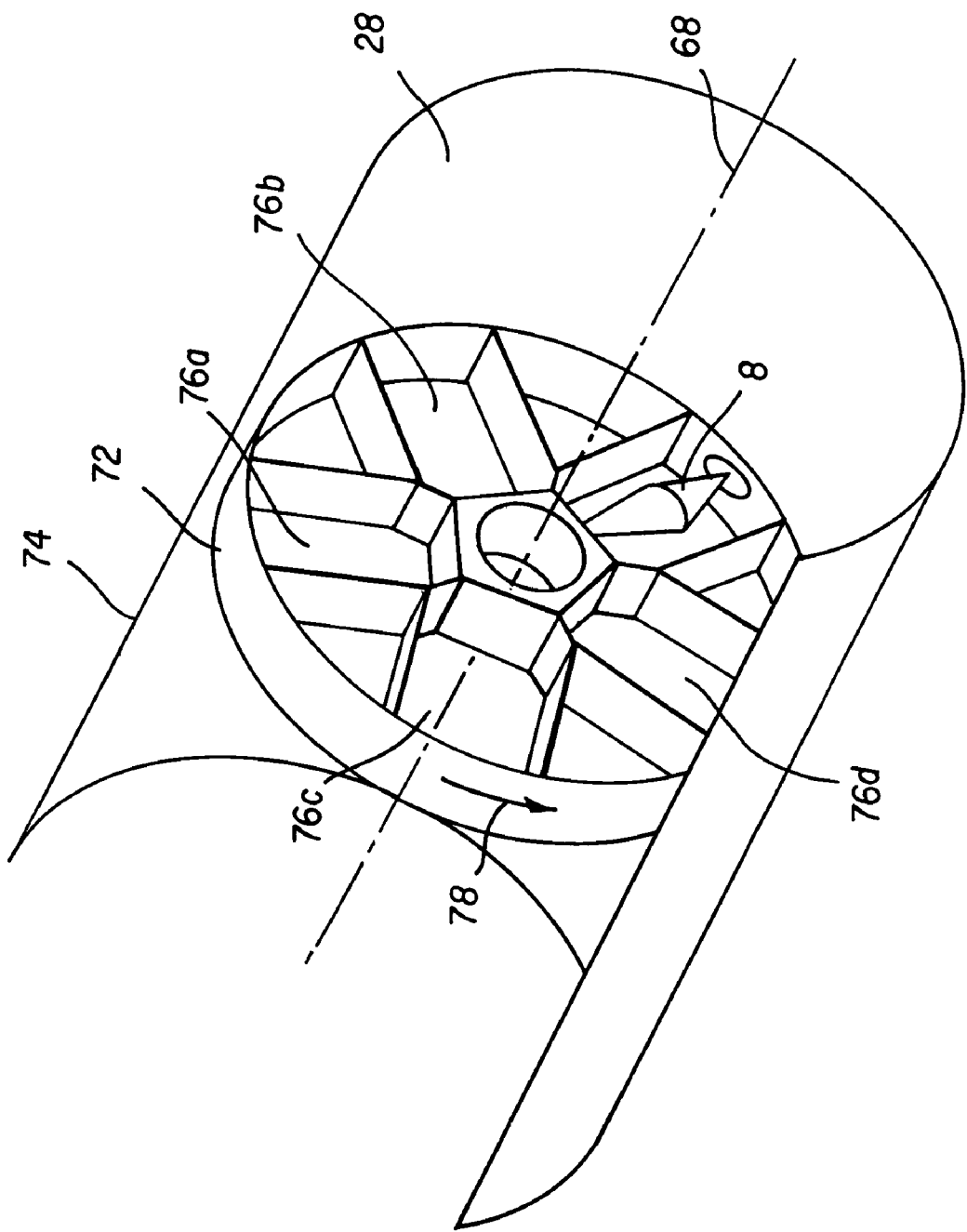
FIG. 3 depicts a cross-sectional perspective view of individual scanning modules placed on a rotating disc or spinner inside a drum holding radiographic media.

FIG. 3 depicts the embodiment of individual scanning modules placed on a rotating disc or spinner 72 over a radiographic media 28 placed inside of a non-rotating drum 74. Using the scanning modules in a rotating disc or spinner 72 achieves faster scanning of an image than with the line scanning method. A scanning module 8 is disposed in the rotating disc or spinner 72. More than one scanning module 8 can be added to the rotating disc or spinner 72 to provide a smoother, more even scanning of the image. FIG. 3 depicts the use of a single scanning module 8, but others could be placed in the open slots 76a, 76b, 76c, and 76d.

The rotating disc or spinner 72 turns around the central axis 68. The rotating disc or spinner 72 can move in either direction around the central axis 68. FIG. 3 shows the rotating disc or spinner 72 turning around the central axis 68 in a counter-clockwise direction 78.

Figure 4:
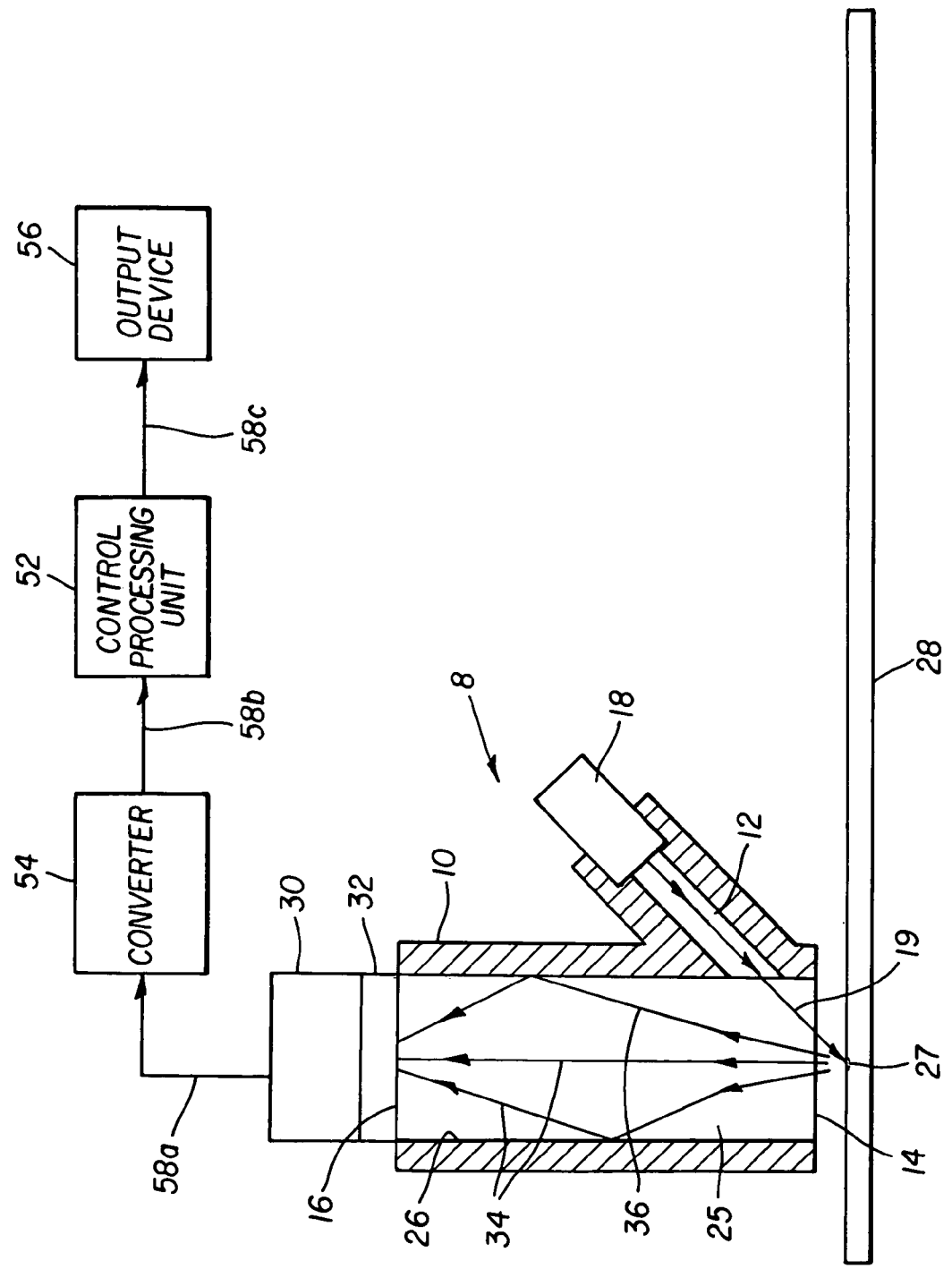
FIG. 4 is a schematic of the system.

FIG. 4 illustrates one or more scanning modules that could be used in this system. Further the light detector 30 is shown in communication, such as by a wireless link, with an analog to digital converter 54 adapted to receive signal 58a from the light detector 30.

A control processing unit 52 converts signal 58a to signal 58b from the analog to digital converter 54. The control processing unit 52 is capable of storing the now digital signal 58c.

The system includes an output device 56 adapted to receive the digital signal 58c from the control processing unit 52. The control processing unit can be a computer, PC or MAC for compiling signals from one or more modules. The output device can be a film writer, printer or display.

The invention has been described in detail with particular reference to certain preferred embodiments thereof, but it will be understood that variations and modifications can be effected within the scope of the invention.

| PARTS LIST | |
|---|---|
| 8 | scanning module |
| 10 | housing |
| 12 | channel |
| 14 | first opening |
| 16 | second opening |
| 18 | laser |
| 19 | beam |
| 25 | cylindrical center chamber |
| 26 | reflective surface |
| 27 | stimulated area or spot |
| 28 | radiographic sheet or media |
| 30 | light detector |
| 32 | filter |

| -continued | |
|---|---|
| PARTS LIST | |
| 34 | emitted light |
| 36 | reflected light |
| 50 | collimator lens |
| 52 | control processing unit |
| 54 | analog to digital converter |
| 56 | output device |
| 58a | signal from light detector |
| 58b | signal analog to digital converter |
| 58c | signal from control process unit |
| 68 | central axis |
| 72 | rotating disc or spinner |
| 74 | non-rotating drum |
| 76a | open slot |
| 76b | open slot |
| 76c | open slot |
| 76d | open slot |
| 78 | counter-clockwise direction |

What is claimed is:

1. A scanning module for emitting light to and collecting light from a photo-stimulable radiographic sheet, comprising:
   (a) a housing comprising a channel; a cylindrical center chamber in communication with the channel comprising a mirrored surface; a first opening communicating with the cylindrical chamber; and a second opening communicating with the cylindrical chamber;
   (b) a laser disposed in the housing and adapted to generate a beam of stimulating electromagnetic radiation through the channel and the first opening onto a stimulated area of the photo-stimulatable radiographic sheet, and wherein the stimulated area emits light and reflected light, both of which enter the first opening and the cylindrical chamber;
   (c) a light detector disposed in the second opening for receiving light emitted and reflected into the cylindrical chamber;
   (d) a filter disposed at the second opening of the housing for selectively passing only the emitted light from the stimulated area of the photo-stimulatable radiographic sheet to the light detector; and
   wherein the center chamber is an elliptical reflector comprising an overall length between 15 mm and 30 mm and a degree of curvature in the chamber between 20 degrees and 30 degrees.

2. The scanning module of claim 1 wherein the radiographic sheet is a phosphorous sheet.

3. The scanning module of claim 1 wherein the laser is a multimode, 635 nanometer, 100 mW, or a single mode 635 nanometer, 100 mW laser.

4. The scanning module of claim 1 wherein the filter is a blue filter.

5. The scanning module of claim 1 wherein the housing comprises a plastic, a polycarbonate, a composite, or a metal.

6. The scanning module of claim 1 wherein the housing is a molded one-piece construction.

7. The scanning module of claim 1, wherein the optical filter comprises an anti-reflective coating.

8. A system for emitting light to and collecting light from a photo-stimulatable radiographic sheet comprising:
   (a) a housing comprising a channel; a cylindrical center chamber in communication with the channel comprising a mirrored surface; a first opening communicating with the cylindrical chamber; and a second opening communicating with the cylindrical chamber;

(b) an analog to digital converter adapted to receive a signal from the light detector;

(c) a control processing unit adapted to receive the signal from the analog to digital converter, wherein the control processing unit stores the signal;

(d) an output device adapted to receive the signal from the control processing unit; and wherein the center chamber is an elliptical reflector having an overall length between 15 and 30 mm and a degree of curvature in the chamber between 20 and 30 degrees.

9. The scanning system of claim 8 wherein the radiographic sheet is a phosphorous sheet.

10. The scanning system of claim 8 wherein the laser is a multimode, 635 nanometer, 100 mW, or a single mode 635 nanometer, 100 mW laser.

11. The scanning system of claim 8, wherein a blue filter is disposed at the second opening.

12. The scanning system of claim 8 wherein the housing comprises a plastic, a polycarbonate, a composite or a metal.

13. The scanning system of claim 8 wherein the housing is a molded one piece construction.

14. The scanning system of claim 8, wherein said system is mounted on a rotating disc to scan radiographic media mounted on an integral rotating drum.

* * * * *